US010458356B2

(12) United States Patent
Kono

(10) Patent No.: US 10,458,356 B2
(45) Date of Patent: Oct. 29, 2019

(54) VEHICLE CONTROL APPARATUS

(71) Applicant: DENSO CORPORATION, Kariya, Aichi-pref. (JP)

(72) Inventor: Masaki Kono, Inazawa (JP)

(73) Assignee: DENSO CORPORATION, Kariya (JP)

( * ) Notice: Subject to any disclaimer, the term of this patent is extended or adjusted under 35 U.S.C. 154(b) by 458 days.

(21) Appl. No.: 14/526,981

(22) Filed: Oct. 29, 2014

(65) Prior Publication Data

US 2015/0120168 A1 Apr. 30, 2015

(30) Foreign Application Priority Data

Oct. 31, 2013 (JP) .................................. 2013-226806

(51) Int. Cl.
*F02D 41/22* (2006.01)
*F02D 41/02* (2006.01)
(Continued)

(52) U.S. Cl.
CPC .............. *F02D 41/22* (2013.01); *B60K 28/10* (2013.01); *B60W 30/188* (2013.01); *B60W 50/038* (2013.01); *B60W 50/045* (2013.01); *B60W 2520/10* (2013.01); *B60W 2540/10* (2013.01); *B60W 2540/12* (2013.01); *B60W 2540/16* (2013.01); *F02D 11/106* (2013.01); *F02D 41/023* (2013.01); *F02D 41/042* (2013.01);
(Continued)

(58) Field of Classification Search
CPC ...... F02D 41/22; F02D 41/023; F02D 41/042; F02D 2200/602; F02D 2250/18; F02D 2200/101; F02D 11/106; F02D 2200/1002; B60K 28/10; B60W 30/188; B60W 50/045; B60W 50/038; B60W 2520/10; B60W 2540/10; B60W 2540/12; B60W 2540/16
See application file for complete search history.

(56) References Cited

U.S. PATENT DOCUMENTS 6,237,563 B1 * 5/2001 Froehlich .............. F02D 11/105
123/350
7,957,881 B2 * 6/2011 Itoh ........................ B60T 8/175
180/197
(Continued)

FOREIGN PATENT DOCUMENTS

JP 2009-062998 3/2009

*Primary Examiner* — Hung Q Nguyen
*Assistant Examiner* — Brian P Monahon
(74) *Attorney, Agent, or Firm* — Nixon & Vanderhye, P.C.

(57) ABSTRACT

A vehicle control apparatus performs an in-excess determination control by monitoring a drive power in-excess indicator at a time when a temporary in-excess state occurs which indicates that a drive power excess amount exceeds a predetermined value. As such, when a vehicle-dynamic safety parameter fulfills a prescribed condition, the vehicle control apparatus lowers an indicator threshold for determining an excess drive power continuation time from an original value to a lowered value. As a result, the excess drive power continuation time is determined as exceeding the indicator threshold, which indicates that a drive power of a vehicle is in excess, and a fail-safe instruction signal output is brought forward from an original timing to an earlier timing. Therefore, when a degree of dangerousness of a vehicle behavior is estimated to be relatively high, a fail-safe action is promptly taken.

8 Claims, 8 Drawing Sheets

(51) Int. Cl.
*F02D 41/04* (2006.01)
*F02D 11/10* (2006.01)
*B60W 50/04* (2006.01)
*B60W 30/18* (2012.01)
*B60K 28/10* (2006.01)
*B60W 50/038* (2012.01)
*B60W 30/188* (2012.01)

(52) U.S. Cl.
CPC ............... *F02D 2200/101* (2013.01); *F02D 2200/1002* (2013.01); *F02D 2200/602* (2013.01); *F02D 2250/18* (2013.01)

(56) References Cited

U.S. PATENT DOCUMENTS

| | | | | |
|---|---|---|---|---|
| 8,676,474 B2* | 3/2014 | Peterson | ............... | F02D 31/007 701/1 |
| 9,863,334 B2* | 1/2018 | Arikai | ............... | F02D 41/0215 |
| 2005/0138997 A1* | 6/2005 | Okumura | ............... | F02D 11/107 73/114.33 |
| 2007/0225886 A1* | 9/2007 | Morris | ............... | B60K 1/02 701/51 |
| 2009/0012670 A1* | 1/2009 | Gruenter | ............... | F02D 11/105 701/84 |
| 2009/0018733 A1* | 1/2009 | Livshiz | ............... | F02D 11/105 701/54 |
| 2009/0299602 A1* | 12/2009 | Hartrey | ............... | F02D 41/1497 701/102 |
| 2010/0036558 A1* | 2/2010 | Murakami | ............... | B60W 30/188 701/31.4 |
| 2010/0057283 A1* | 3/2010 | Worthing | ............... | F02D 41/1497 701/22 |
| 2010/0057316 A1* | 3/2010 | Tanaka | ............... | F16H 61/12 701/61 |
| 2011/0022288 A1* | 1/2011 | Soejima | ............... | F02D 37/02 701/103 |
| 2011/0077835 A1* | 3/2011 | Otsuka | ............... | B60W 10/06 701/99 |
| 2012/0029760 A1* | 2/2012 | Murakami | ............... | G07C 5/0808 701/30.8 |
| 2012/0059539 A1* | 3/2012 | Arnett | ............... | B60L 11/00 701/22 |
| 2012/0101705 A1* | 4/2012 | Templin | ............... | B60W 30/20 701/99 |
| 2012/0109439 A1* | 5/2012 | Akebono | ............... | B60W 10/02 701/22 |
| 2012/0138016 A1* | 6/2012 | Martin | ............... | F02D 37/02 123/406.23 |
| 2012/0173066 A1* | 7/2012 | Yamada | ............... | B60L 11/1803 701/22 |
| 2012/0173101 A1* | 7/2012 | Peterson | ............... | B60W 30/1882 701/54 |
| 2012/0185143 A1* | 7/2012 | Ohno | ............... | B60L 3/0061 701/99 |
| 2012/0221219 A1* | 8/2012 | Murata | ............... | F16H 61/143 701/60 |
| 2013/0013142 A1* | 1/2013 | Andoh | ............... | B62K 11/007 701/22 |
| 2013/0035844 A1* | 2/2013 | Iriyama | ............... | F02D 29/02 701/110 |
| 2013/0238219 A1* | 9/2013 | Ando | ............... | F02D 41/22 701/102 |
| 2017/0002753 A1* | 1/2017 | Miyazaki | ............... | F02D 41/22 |

* cited by examiner

IN-EXCESS DETERMINATION CONTROL

SAF-PARAM FULFILMENT

DRV-PW EXCESS AMOUNT E

EXCESS DRV-PW CONTINUATION TIME (COUNTER)

F/S-INST SIG

IN-EXCESS DETERMINATION CONTROL

SAF-PARAM FULFILMENT

DRV-PW EXCESS AMOUNT E

EXCESS DRV-PW CONTINUATION TIME (COUNTER)

F/S-INST SIG

IN-EXCESS DETERMINATION CONTROL

SAF-PARAM FULFILMENT

DRV-PW EXCESS AMOUNT E

F/S-INST SIG

IN-EXCESS DETERMINATION CONTROL

SAF-PARAM CONDITION FULFILMENT

DRV-PW EXCESS AMOUNT E

EXCESS AMOUNT INTEGRATION VALUE

F/S-INST SIG

VEHICLE CONTROL APPARATUS

CROSS REFERENCE TO RELATED APPLICATION

The present application is based on and claims the benefit of priority of Japanese Patent Application No. 2013-226806, filed on Oct. 31, 2013, the disclosure of which is incorporated herein by reference.

TECHNICAL FIELD

The present disclosure generally relates to a vehicle control apparatus providing a fail-safe control.

BACKGROUND INFORMATION

Conventionally, when an abnormality occurs in a drive power controller of a vehicle, an excessive amount of an actual drive power of the vehicle with respect to a driver's requested drive power is controlled by a fail-safe control. The fail-safe control performs a fail-safe action by shutting down a drive system of the vehicle.

For example, a vehicle control system disclosed in a patent document 1 (i.e., Japanese Patent Laid-Open No. 2009-62998) stops or reduces the output of the power source when an actual acceleration of the vehicle differs from a driver's requested acceleration.

The system of the patent document 1 performs the fail-safe action, when a malfunction detection unit detects that the actual acceleration is greater than the requested acceleration. In such a configuration, when the actual acceleration returns to normal immediately after temporarily exceeding the requested acceleration, the fail-safe action may be unnecessarily performed. Similarly, when a misdetection of the greater-than-requested acceleration occurs due to a disturbance, noise, etc., the fail-safe action may also be unnecessarily performed. Such an unnecessarily performed fail-safe action may lead to a deterioration of vehicle functions which is undesirable.

Further, depending on the vehicle behavior at the time of performing a drive power in-excess determination or, more specifically, according to a travel safety related vehicle behavior at such moment, the necessity for performing the fail-safe action is not uniformly determined. For example, when the drive power in a rear-wheel drive vehicle is excessive, if the amount of brake depression by a driver is large (i.e., if the driver depresses the brake pedal too abruptly), vehicle spinning or wheelspin may be easily caused. Also, in other cases such as (i) a large steering input into the steering wheel, (ii) a high speed or high acceleration situation, (iii) a vehicle traveling on a slippery road, or the like, a degree of danger may increase to a relatively high level. As a result, the fail-safe action such as stopping or suppressing of the engine drive and/or the motor-generator drive of the vehicle may have to be performed very quickly. However, the disclosure of the patent document 1 is silent about changing the determination standards/criteria based on which the fail-safe action is performed according to a vehicle behavior.

SUMMARY

It is an object of the present disclosure to provide a vehicle control apparatus that is capable of appropriately performing a fail-safe action according to a travel safety related vehicle behavior when an actual drive power of the vehicle is in excess relative to a requested drive power.

In an aspect of the present disclosure, the vehicle control apparatus includes an actuator controlling a drive of a vehicle, a main calculator calculating an instructed drive power based on a requested drive power of the vehicle and instructing the actuator to operate according to the instructed drive power, and a monitor section monitoring at least one of (i) the instructed drive power or (ii) an actual drive power that is output from the actuator according to the instructed drive power.

Further, based on a drive power excess amount calculated by deducting the requested drive power from either the actual drive power or the instructed drive power, the vehicle control apparatus performs an in-excess determination control that executes a fail-safe action regarding a drive of the vehicle by monitoring a drive power in-excess indicator started at a time of a temporary in-excess state of the drive power excess amount in which the drive power excess amount exceeds a predetermined value, and determining that the drive power is in excess when the drive power in-excess indicator exceeds a preset indicator threshold.

Further, when performing the in-excess determination control, the vehicle control apparatus lowers the indicator threshold when a vehicle-dynamic safety parameter that reflects a travel safety related vehicle behavior fulfills a prescribed condition.

According to the present disclosure, the fail-safe action is taken only after a "two-step" determination, i.e., after (i) performing the in-excess determination control and (ii) determining that the drive power is in excess. Therefore, when a temporary in-excess state of the drive power returns to a normal state immediately after such an in-excess state, or when the in-excess state is a misdetection of such an in-excess state due to a disturbance noise or by other faults, such a temporary in-excess state or a misdetected in-excess state of the drive power does not cause an unnecessary fail-safe action. That is, the vehicle control apparatus of the present disclosure is capable of preventing the unnecessary fail-safe action that may otherwise be performed, and preventing the deterioration of the vehicle functions/performance.

The drive power in-excess indicator is confirmation information confirming that a current situation indicates a very high probability of the vehicle actually having an in-excess drive power. More specifically, the drive power in-excess indicator may be (i) an "excess drive power continuation time during which a drive power in-excess state continues after a start of having the "temporary in-excess state", or (ii) an absolute value of the "drive power excess amount", or (iii) a time integration value of the "drive power excess amount".

As a vehicle-dynamic safety parameter, the amount of depression of the brake pedal, the amount of depression of the accelerator pedal, a steer angle of the steering wheel, a steering speed of the steering wheel, a steer angle of front/rear tire, a vehicle speed, an acceleration of the vehicle, a yaw angular velocity, a yaw angular acceleration, a difference between rotations speeds of respective wheels, a road surface friction coefficient, a shift position, etc., may be a few of them among others.

From among the above-mentioned vehicle-dynamic safety parameters, the following parameters, i.e., from the amount of depression of the brake pedal to the difference between rotation speeds of respective wheels, are a positive correlation type vehicle-dynamic safety parameter respectively, with which a higher degree of dangerous vehicle behavior is represented when the parameter value increases. The road surface friction coefficient is a negative correlation type vehicle-dynamic safety parameter with which a higher degree of dangerous vehicle behavior is represented when the parameter value decreases. Further, the shift position is a mode select type vehicle-dynamic safety parameter with which a higher degree of dangerous vehicle behavior becomes is represented when a specific mode is selected. These vehicle-dynamic safety parameters may be used in a combined manner.

The "prescribed condition" of a vehicle-dynamic safety parameter is set up in the following manner. That is, when the "prescribed condition" of the vehicle-dynamic safety parameter is fulfilled, it is highly probable that the degree of dangerous vehicle behavior is relatively high, which necessitates that the fail-safe action is required as soon as possible. That is, for example, regarding a positive correlation type vehicle-dynamic safety parameter, when the parameter value exceeds a specified value, a prescribed condition is configured to be fulfilled.

In the present disclosure, the in-excess determination control lowers the indicator threshold of the drive power in-excess indicator when the vehicle-dynamic safety parameter fulfills a prescribed condition, for determining that the drive power is in excess at an earlier timing or at a lighter/looser condition. Therefore, before experiencing a vehicle spin or a wheelspin in the rear-wheel drive vehicle due to a steep depression of the brake pedal, the fail-safe action is performed. Thus, according to the travel safety related vehicle behavior, the fail-safe action is appropriately performed.

Further, according to a value of the vehicle-dynamic safety parameter, the amount of lowering of the indicator threshold of the drive power in-excess indicator may be changed. For example, for the positive correlation type vehicle-dynamic safety parameter, the amount of lowering of the indicator threshold may be increased, when the parameter value is large. Thereby, the determination criteria for determining whether the fail-safe action should be performed are adjusted to an appropriate level, according to a degree of dangerous vehicle behavior.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
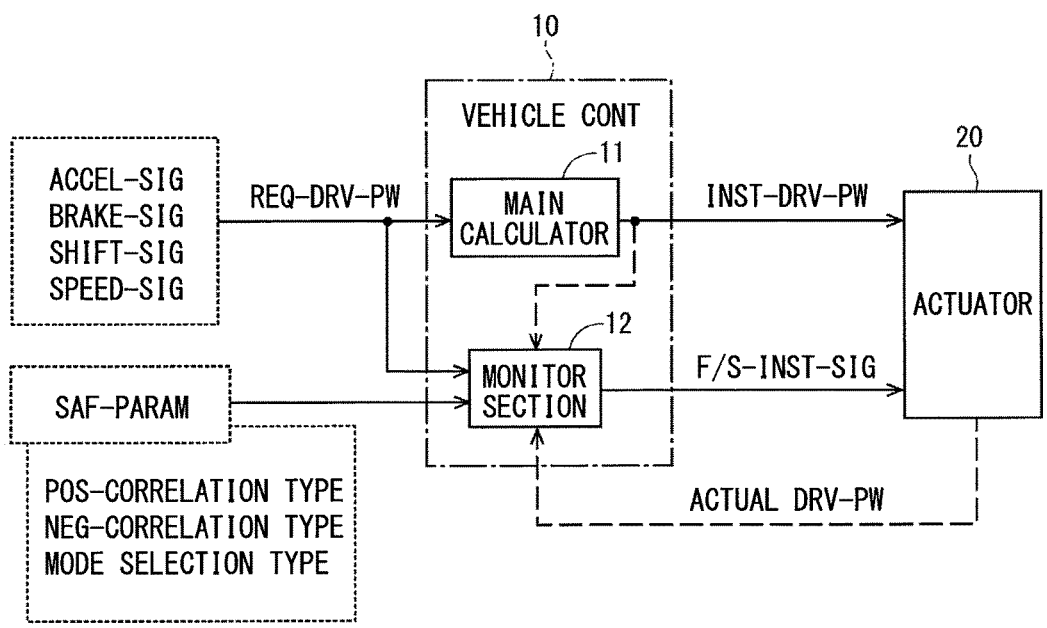
FIG. 1 is a block diagram of a vehicle control apparatus in an embodiment of the present disclosure.

Hereafter, multiple embodiments of the present disclosure are described with reference to the drawing. In those embodiments, like parts have like numbers, for the brevity of description.

(Base Configuration)

The base configuration of a vehicle control apparatus and a drive power monitoring process performed by the vehicle control apparatus in an embodiment of the present disclosure (i.e., in a "base" embodiment serving as a basis of the first, second, third and other embodiments) are described with reference to FIG. 1 and FIG. 2.

This vehicle control apparatus is applicable to any type of vehicle that is equipped with a drive power source that is variably controllable in an engine driven vehicle, in an electric vehicle, in a hybrid vehicle or the like.

Figure 2:
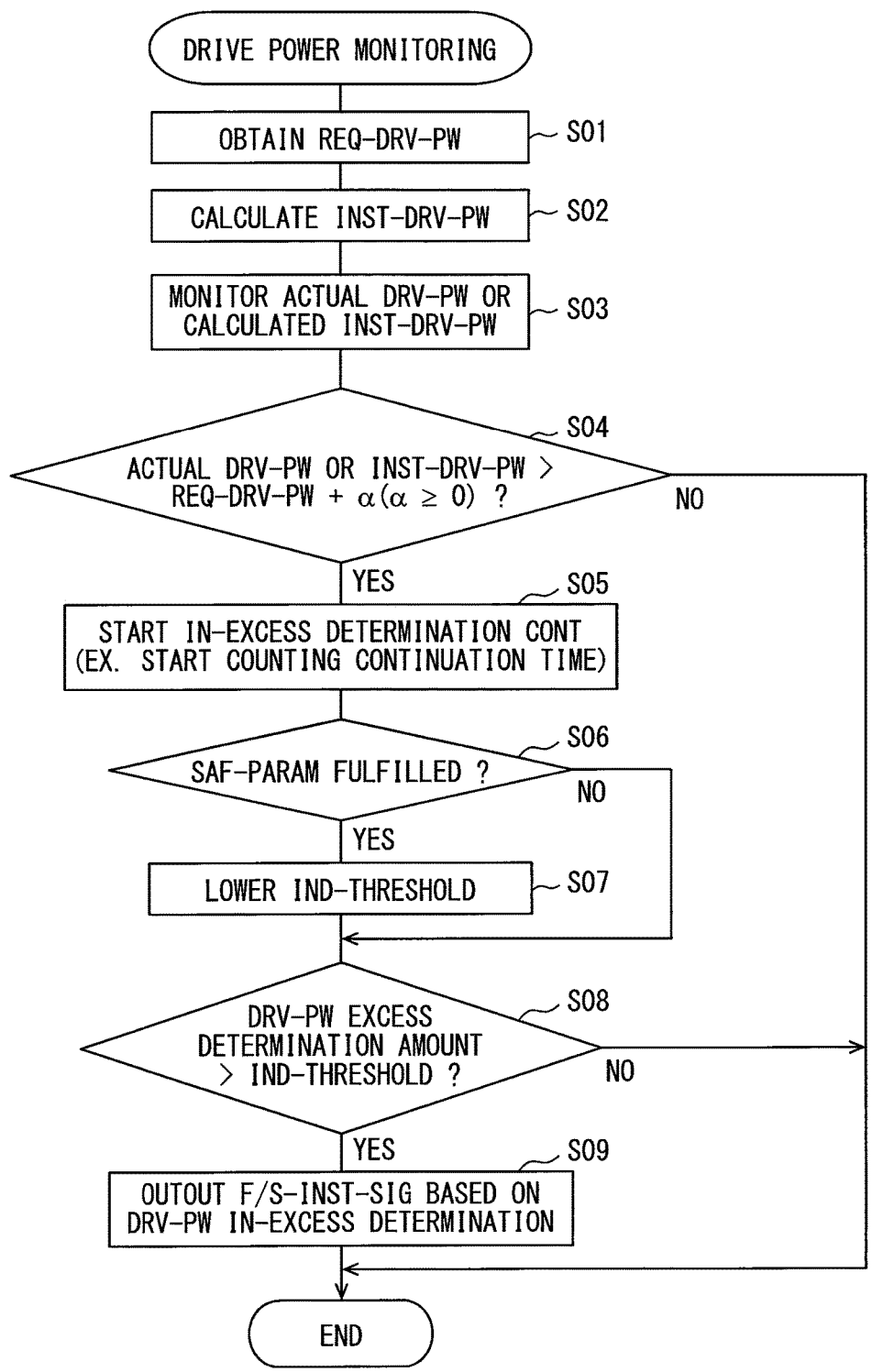
FIG. 2 is a flowchart of a drive power monitoring process in the embodiment of the present disclosure.

As shown in FIG. 1, a vehicle controller 10 receives an input of a requested drive power concerning the drive of the vehicle, and outputs an instructed drive power to an actuator 20, which is a control object under control of such an instruction. The requested drive power is inputted based on an accelerator signal from an accelerator sensor, a brake signal from a brake switch, a shift signal from a shift switch, a speed signal about a speed of the vehicle, etc., for example.

Further, a "vehicle-dynamic safety parameter" is also inputted to the controller 10, and the vehicle controller 10 outputs a fail-safe instruction signal to the actuator 20.

The vehicle controller 10 is provided with a main calculator 11 and a monitor section 12. The main calculator 11 calculates the instructed drive power based on the requested drive power, and sends an instruction to the actuator 20. The vehicle controller 10 may be implemented as an ECU provided with a microcomputer, for example. The vehicle controller 10 may also be implemented in any physical form. That is, the main calculator 11 and the monitor section 12 may be mounted on the same substrate, or may respectively be mounted on different substrates.

The actuator 20 includes a device that is used to drive the vehicle. That is, the actuator 20 may be a drive power source of the vehicle, e.g., an engine, a motor-generator, a driver directly driving the engine/motor-generator which may be an injector for the engine or an inverter for the motor-generator, and/or other sensors for detecting a crank angle, a rotation angle, an output torque and the like and for providing feedback therefrom. In general, according to the instructed drive power, which is calculated by the main calculator 11 of the vehicle controller 10, the actuator 20 converts a fuel energy and/or an electrical energy for generating an "actual drive power" of the vehicle.

Further, regarding the vehicle controller 10, the monitor section 12 obtains the requested drive power, and monitors at least one of the instructed drive power which is calculated by the main calculator 11, or the actual drive power which is output by the actuator 20. The long broken line arrows in FIG. 1 indicate that at least one of those drive powers is input to the monitor section 12.

The monitor section 12 compares (a) the requested drive power with (b) the actual drive power or the instructed drive power. In an ideal control situation, (a) may be equated with (b). However, the actual drive power may be diverted from the instructed drive power due to a power loss of the actuator 20 and/or a control abnormality of a drive power source ECU, etc., and the instructed drive power may be diverted from the requested drive power due to a calculation abnormality of the main calculator 11, or the like. Especially, diversion of the actual drive power and the instructed drive power diverting to a larger side relative to the requested drive power may increase a probability of causing a dangerous state of the vehicle behavior.

Therefore, by outputting a fail-safe instruction signal to the actuator 20, the monitor section 12 outputs an instruction for taking a fail-safe action that stops or restricts the drive of the actuator 20 or the like when the actual drive power or the instructed drive power becomes excessive relative to the requested drive power.

Further, the "vehicle-dynamic safety parameter" which reflects a travel safety related vehicle behavior is inputted to the monitor section 12. For example, in case of having an excessive drive power for a rear-wheel drive vehicle, if the amount of depression of the brake pedal by the driver of the vehicle is large, the vehicle is put in a dangerous state, in which the vehicle may spin or the vehicle's wheels may spin. In this case, the amount of depression of the brake pedal corresponds to the vehicle-dynamic safety parameter.

Such a vehicle-dynamic safety parameter is classified into three types, i.e., a positive correlation type, a negative correlation type, and a mode selection type.

A positive correlation type vehicle-dynamic safety parameter is a parameter of representing a high degree of dangerous vehicle behavior when a parameter value is large/high, such as the amount of depression of the brake pedal. The positive correlation type vehicle-dynamic safety parameter may be, other than the brake depression amount, the amount of depression of the accelerator pedal, a steer angle of the steering wheel, a steering speed of the steering wheel, a steer angle of front/rear tire, a vehicle speed, an acceleration of the vehicle, a yaw angular velocity, a yaw angular acceleration, a difference between rotations speeds of respective wheels, and the like.

As for the negative correlation type vehicle-dynamic safety parameter, a high degree of dangerous vehicle behavior is represented by a parameter value that is small/low, in contrast. For example, a road surface friction coefficient μ represents a greater degree of dangerousness when its value is smaller, i.e., representing a slippery state in which the tire may easily slip, and represents a smaller degree of dangerousness when its value is large, serving as a negative correlation type vehicle-dynamic safety parameter.

As for the mode selection type vehicle-dynamic safety parameter, a specific mode among other selectable modes represents a higher degree of dangerous ness of the vehicle behavior. For example, when the vehicle is in the drive power in-excess mode, the shift position of N (Neutral) may represent a lower degree of dangerousness because the drive power will not be transmitted to the tires/wheels, and the shift position of D or the like may represent a higher degree of dangerousness because the drive power will be transmitted to the tire/wheels. In other words, the shift position serves as a mode selection type vehicle-dynamic safety parameter.

In the present disclosure, the monitor section 12 obtains the above-described vehicle-dynamic safety parameters, and the vehicle controller 10 performs a drive power monitoring control based on the obtained parameters.

Next, a drive power monitoring process performed by the vehicle controller 10 is described with reference to a flow-chart in FIG. 2. The sign "S" in the following description of the flowchart indicates a step.

In S01, the requested drive power concerning the drive of the vehicle is obtained from an accelerator signal, a brake signal, a shift signal, a speed signal, etc., In S02, the main calculator 11 calculates the instructed drive power based on the requested drive power.

In S03, either the actual drive power which is obtained from the actuator 20 by the monitor section 12 or the instructed drive power which is calculated by the main calculator 11 is monitored. As mentioned above, the monitor section 12 may monitor the actual drive power or the instructed drive power. The same following process is usable for monitoring either the actual drive power or the instructed drive power.

In S04, it is determined whether the actual drive power or the instructed drive power exceeds a value which is calculated as a sum of "a specified threshold value α greater than zero" and the requested drive power. In the following, a value which is calculated by deducting the requested drive power either from the actual drive power or the instructed drive power is designated as "a drive power excess amount E". Thus, the process in S04 may be re-stated as "it is determined whether the drive power excess amount E exceeds a threshold value α". The threshold value α is set as a somewhat greater value that is greater than an operation error or an overshoot range which is expected as a tolerance, for example.

Even when it is determined that the drive power excess amount E has exceeded the threshold value α in S04 as YES, it may possibly be a temporary phenomenon with a possibility of immediately returning to normal, or it may possibly be a misdetection due to a disturbance noise or the like. In such a case, vehicle functions may be hindered if the unnecessary fail-safe action is performed.

Thus, the vehicle controller 10 of the present embodiment performs an "in-excess determination control" in the following steps of S05-S09 which determines whether it is actually necessary to perform the fail-safe action, based on a recognition that a state of determination in S04 is a "temporary in-excess state".

On the other hand, in case of NO determination in S04, the processing is ended.

In the in-excess determination control, the drive power in-excess indicator is monitored, and when the drive power in-excess indicator exceeds a predetermined indicator threshold, it is definitively "determined" that the drive power is in excess. In other words, the "drive power in-excess indicator" is confirmation information confirming that a current situation indicates a high probability of the vehicle actually having an in-excess drive power, which may more practically be described in the following embodiments. That is, for example, in the first embodiment, an "excess drive power continuation time" during which a drive power in-excess state (i.e., a state of the drive power excess amount E exceeding the threshold value α) continues is used as a drive power in-excess indicator.

The in-excess determination control is started in S05. For example, when adopting the excess drive power continuation time as the drive power in-excess indicator, the count of such continuation time is started in S05. The indicator threshold is set to a value so that the prescribed condition of the vehicle-dynamic safety parameter is not fulfilled in this step with such set value.

Next, in S06, it is determined whether the vehicle-dynamic safety parameter which is obtained by the monitor section 12 fulfills the prescribed condition. The vehicle-dynamic safety parameter used for this determination may be a single vehicle-dynamic safety parameter, or may be a combination of two or more vehicle-dynamic safety parameters.

The prescribed condition of the vehicle-dynamic safety parameter is set up it be fulfilled when the degree of dangerous vehicle behavior is relatively high, i.e., when it is assumed that a quick fail-safe action is required. For example, as for the positive correlation type vehicle-dynamic safety parameter, the prescribed condition is configured to be fulfilled when the parameter value exceeds a specified value, and as for the negative correlation type vehicle-dynamic safety parameter, the prescribed condition is configured to be fulfilled when the parameter value falls below the specified value. Further, as for the mode selection type vehicle-dynamic safety parameter, the prescribed condition is configured to be fulfilled when the specific mode is selected.

Then, the vehicle controller 10 of the present embodiment lowers an indicator threshold in S07 in case that the determination in S06 is YES, which may be a characteristic feature of the present disclosure. When the determination in S06 is NO, step S07 is skipped.

In such manner, the monitoring of the drive power in-excess indicator continues, and when the drive power in-excess indicator exceed the indicator threshold (S08:YES), it is determined that the drive power is in excess, and the fail-safe instruction signal is output to the actuator 20 (S09). The actuator 20 which has received the fail-safe instruction signal performs the fail-safe action of stopping or restricting a drive of the actuator 20.

The routine execution of the drive power monitoring process concludes in this manner. On the other hand, when the drive power in-excess indicator does not exceed the indicator threshold (S08:NO), the fail-safe instruction signal is not output.

Next, the "drive power in-excess indicator" in the in-excess determination control that is performed by the vehicle controller 10 is described with reference to a time chart in each of the following embodiments.

(First Embodiment)

The in-excess determination control in the first embodiment of the present disclosure is described with reference to FIGS. 3A/B/C/D/E and FIGS. 4 A/B/C/D/E.

The time charts in FIGS. 3 A/B/C/D/E and FIGS. 4 A/B/C/D/E set a horizontal axis as having a common time scale, and vertical axes of charts 3A/4A are about an execution (ON) or a stop (OFF) of the in-excess determination control, of charts 3B/4B are about a fulfillment of the vehicle-dynamic safety parameter (ON:Fulfilling, OFF: Non-fulfilling) of charts 3C/4C are about a drive power excess amount E, of charts 3D/4D are about an excess drive power continuation time, and of charts 3E/4E are about a fail-safe instruction signal, respectively. The excess drive power continuation time in FIGS. 3D/4D is the drive power in-excess indicator of the first embodiment.

About the condition fulfillment of the vehicle-dynamic safety parameter, the vehicle-dynamic safety parameter fulfilling the prescribed condition may be described as "Vehicle-dynamic safety parameter conditions are ON", and the vehicle-dynamic safety parameter not fulfilling the prescribed condition may be described as "Vehicle-dynamic safety parameter conditions are OFF". In each drawing, a thick dashed line shows an OFF transition of vehicle-dynamic safety parameter conditions, and a thick solid line shows an ON transition of vehicle-dynamic safety parameter conditions.

Figure 3A:
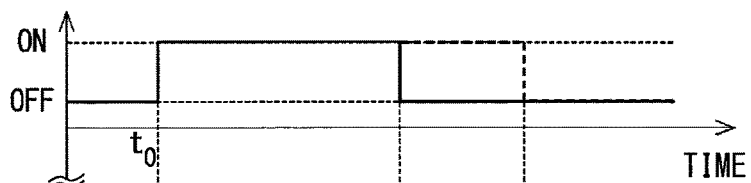
FIG. 3A is a time chart of an in-excess determination control in which a drive power in-excess state is continuing in a first embodiment of the present disclosure.
Figure 3B:
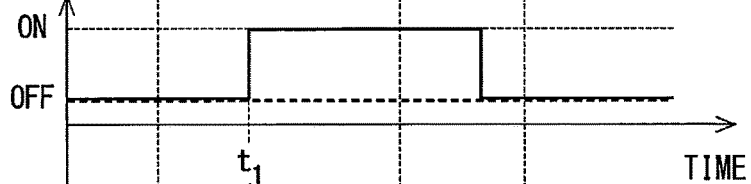
FIG. 3B is a time chart illustrating a fulfillment of the vehicle-dynamic safety parameter in which the drive power in-excess state is continuing in the first embodiment of the present disclosure.
Figure 4A:
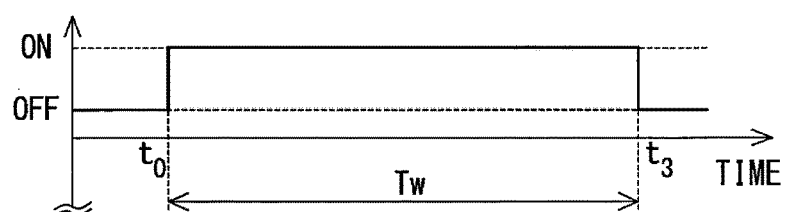
FIG. 4A is a time chart of the in-excess determination control in which a temporary in-excess state returns to a normal state in the first embodiment of the present disclosure.
Figure 4B:
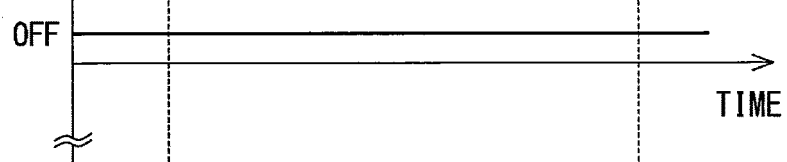
FIG. 4B is a time chart illustrating a fulfillment of the vehicle-dynamic safety parameter in which the temporary in-excess state returns to the normal state in the first embodiment of the present disclosure.
Figure 4C:
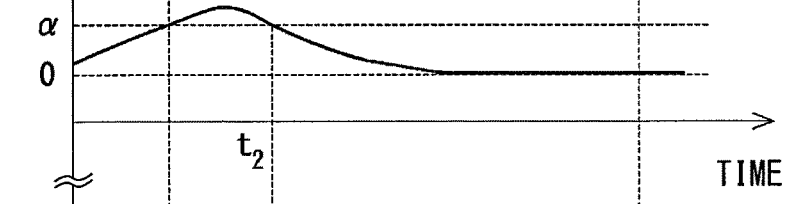
FIG. 4C is a time chart illustrating a drive power excess amount in which the temporary in-excess state returns to the normal state in the first embodiment of the present disclosure.
Figure 4D:
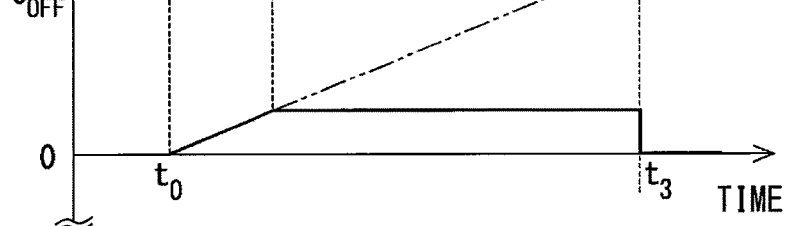
FIG. 4D is a time chart illustrating an excess drive power continuation time in which the temporary in-excess state returns to the normal state in the first embodiment of the present disclosure.
Figure 4E:
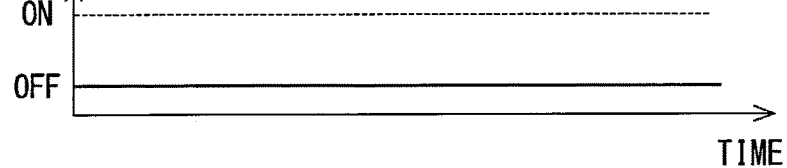
FIG. 4E is a time chart illustrating a fail-safe instruction signal in which the temporary in-excess state returns to the normal state in the first embodiment of the present disclosure.

The drive power excess amount E is put in a temporary in-excess state exceeding the threshold value α at time t0 in both of FIGS. 3A and 4A, which starts the in-excess determination control.

Figure 3C:
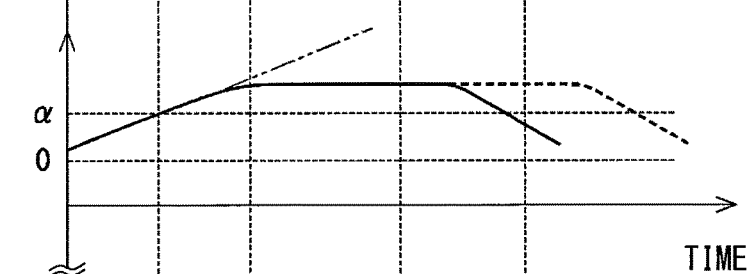
FIG. 3C is a time chart illustrating a drive power excess amount in which the drive power in-excess state is continuing in the first embodiment of the present disclosure.

In FIG. 3C, an excess state in which the drive power excess amount E exceeds the threshold value α continues thereafter, and the counter of the excess drive power continuation time increases linearly. The indicator threshold of the excess drive power continuation time in case that the vehicle-dynamic safety parameter conditions are OFF is set as $C_{OFF}$. Therefore, when the vehicle-dynamic safety parameter conditions continue to be OFF, at time $tf_{OFF}$ when the excess drive power continuation time exceeds the indicator threshold $C_{OFF}$, it is determined that the drive power is in excess, and the fail-safe instruction signal is output. In this manner, the execution of the in-excess determination control is ended. When the actuator 20 stops due to the fail-safe action, the drive power excess amount E will decrease thereafter.

On the other hand, when the vehicle-dynamic safety parameter conditions are turned to ON at time t1 during the in-excess determination control, the vehicle controller 10 lowers the indicator threshold from $C_{OFF}$ to $C_{ON}$. In such manner, at time $tf_{ON}$ when the excess drive power continuation time exceeds the indicator threshold $C_{ON}$, it is determined that the drive power is in excess, and the fail-safe instruction signal is output. In other word, the output timing of the fail-safe instruction signal is brought forward to time $tf_{ON}$ from time $tf_{OFF}$. Therefore, in a situation in which the degree of dangerous vehicle behavior is relatively high, transition to the fail-safe action is caused at an earlier timing. For example, the fail-safe action is performed before the spin of the rear-wheel-drive vehicle is caused by a depression of the brake pedal in such vehicle.

In FIGS. 4A/B/C/D/E, for the comparison with a situation in FIGS. 3A/B/C/D/E, a situation in which the drive power excess amount E returns to a normal, i.e., falling under the threshold value α, soon after the start of the in-excess determination control at time t0 is described. Here, the vehicle-dynamic safety parameter conditions are assumed to be OFF.

After time t0, although the counter of the excess drive power continuation time increases, at time t2 when the drive power excess amount E falls under the threshold value α, the increase of the counter stops. Then, if the excess drive power continuation time is not greater than the indicator threshold $C_{OFF}$ at time t3 that is after a lapse of predetermined monitor time Tw from time t0, the counter is reset, and the in-excess determination control is ended, without outputting the fail-safe instruction signal.

In such manner, the vehicle control apparatus of the present disclosure is capable of (i) preventing the unnecessary fail-safe action that may otherwise be performed and (ii) preventing the deterioration of the vehicle functions when a temporary in-excess state of the drive power returns to normal immediately after such an in-excess state, or when the in-excess state is a misdetection of such a state due to a disturbance noise, or by other faults.

Figure 5A:
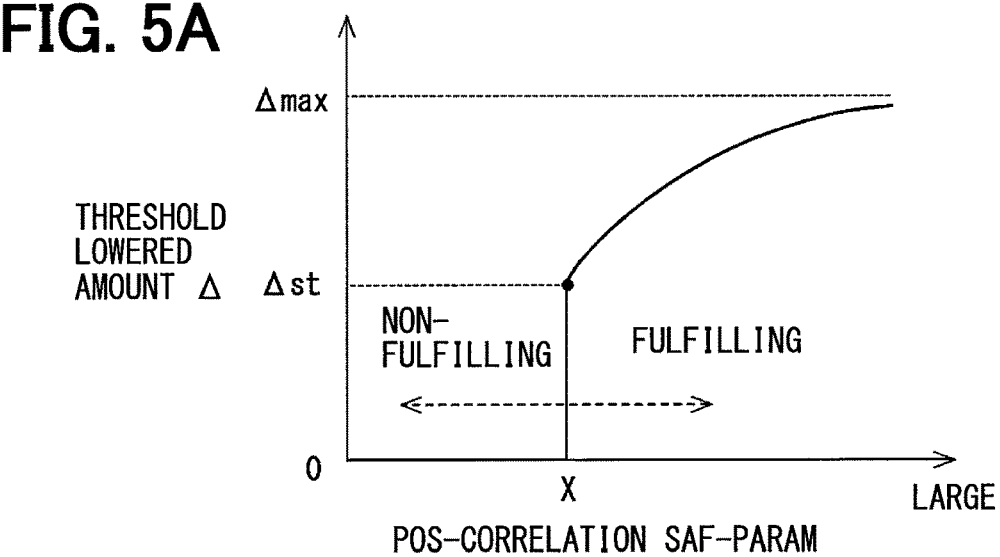
FIG. 5A is a characteristic diagram between a positive correlation type vehicle-dynamic safety parameter and a threshold lowered amount in which the amount of lowering may be asymptotic.

Next, with reference to FIGS. 5A/B/C, how to set a threshold lowered amount is described. That is, how to set an "amount of lowering the indicator threshold, i.e., a difference between the indicator threshold value $C_{OFF}$ and the indicator threshold value $C_{ON}$, when the vehicle-dynamic safety parameter conditions are turned ON", is described. Here, a positive correlation type vehicle-dynamic safety parameter is described as an example.

As for the positive correlation type vehicle-dynamic safety parameter, the necessity of performing the fail-safe action at an earlier timing increases when the parameter value is large. Therefore, the positive correlation type vehicle-dynamic safety parameter is configured to fulfill a prescribed condition when the parameter value is equal to or greater than the specified value X, for the lowering of the indicator threshold. That is, when the parameter value is smaller than X, the threshold lowered amount Δ is set to 0, and when the parameter value is equal to X, the threshold lowered amount Δ is set to a standard value Δst. Further, the threshold lowered amount Δ when the parameter value exceeds X is set according to the following patterns.

Figure 5B:
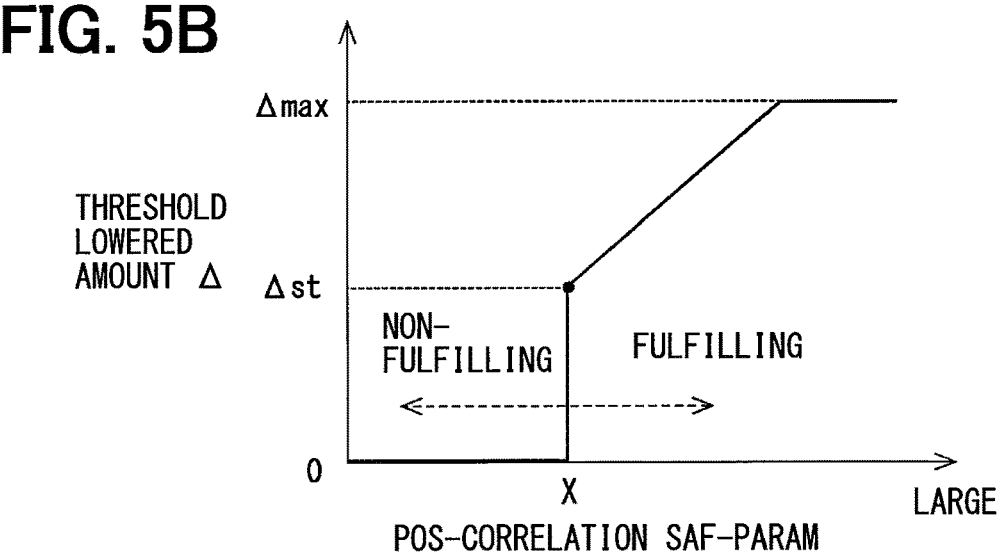
FIG. 5B is a characteristic diagram between the positive correlation type vehicle-dynamic safety parameter and the threshold lowered amount in which the amount of lowering may be linear.

The first pattern is, as shown in FIGS. 5A and 5B, that the threshold lowered amount Δ is increased in proportion to the increase of the parameter value. However, the maximum lowering amount should not exceed the threshold value $C_{OFF}$. Therefore, the amount of lowering may be asymptotic in a curve that approaches to the maximum value Δmax of the threshold lowered amount Δ in FIG. 5A, or the amount of lowering may be linear to the maximum value Δmax which then takes a constant value of Δmax in FIG. 5B. These characteristics lines may be stored as a map. In such manner, the determination criteria for determining whether to perform the fail-safe action may be adjusted more appropriately according to the degree of dangerous vehicle behavior.

Figure 5C:
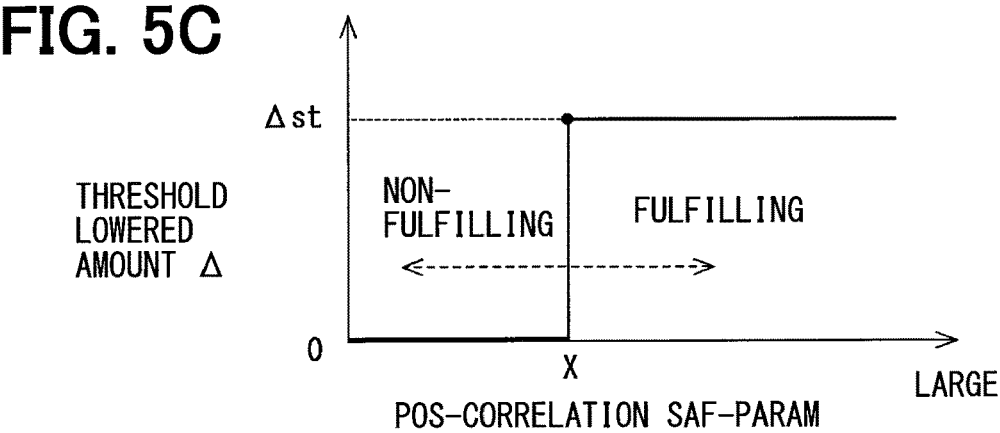
FIG. 5C is a characteristic diagram between the positive correlation type vehicle-dynamic safety parameter and the threshold lowered amount in which the amount is set to a standard value.

The second pattern is, as shown in FIG. 5C, that the threshold lowered amount Δ is uniformly set to the standard value Δst when the parameter value is equal to or greater than X. Thereby, the calculation load of the vehicle controller 10 is reduced.

The characteristic diagrams for the negative correlation type vehicle-dynamic safety parameter have a right-left reversed shape of the characteristic diagrams for the positive correlation type vehicle-dynamic safety parameter. As for the mode selection type vehicle-dynamic safety parameter, none of FIGS. 5A/B/C is applicable because only one threshold lowered amount corresponds to respective modes.

In the following, other embodiments of the drive power in-excess indicator used in the in-excess determination control are described.

(Second Embodiment)

Figure 6A:
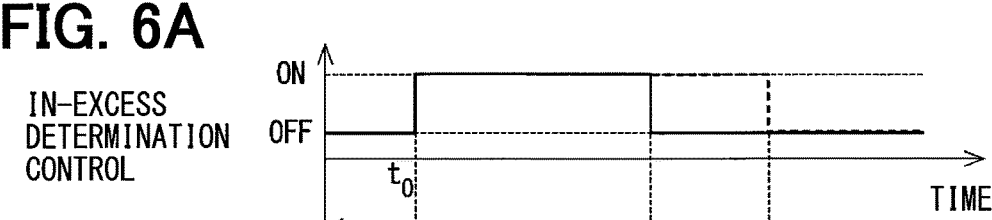
FIG. 6A is a time chart of the in-excess determination control in which the drive power in-excess state is continuing in a second embodiment of the present disclosure.
Figure 6B:
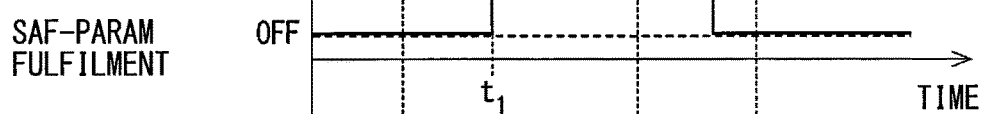
FIG. 6B is a time chart illustrating a fulfillment of the vehicle-dynamic safety parameter in which the drive power in-excess state is continuing in the second embodiment of the present disclosure.

The in-excess determination control in the second embodiment of the present disclosure is described with reference to the time charts of FIGS. 6A/B/C/D.

Figure 3D:
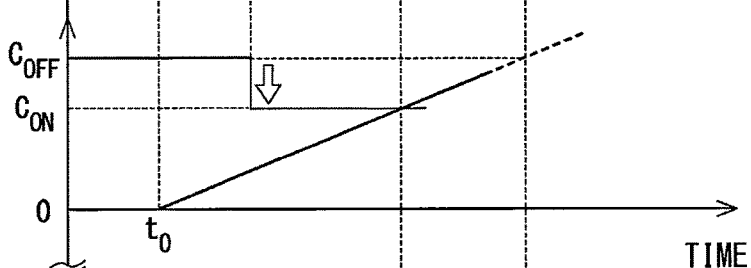
FIG. 3D is a time chart illustrating an excess drive power continuation time in which the drive power in-excess state is continuing in the first embodiment of the present disclosure.
Figure 3E:
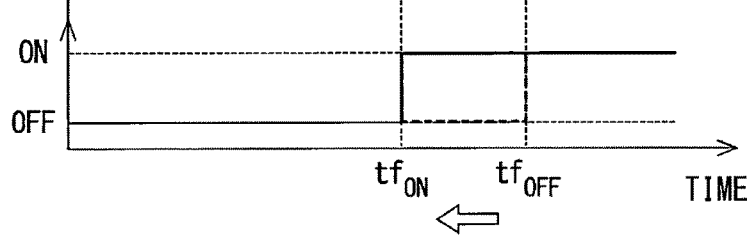
FIG. 3E is a time chart illustrating a fail-safe instruction signal in which the drive power in-excess state is continuing in the first embodiment of the present disclosure.
Figure 6C:
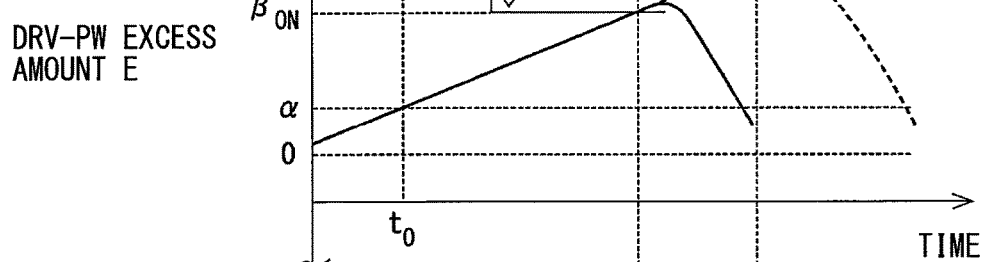
FIG. 6C is a time chart illustrating a drive power excess amount E in which the drive power in-excess state is continuing in the second embodiment of the present disclosure.
Figure 6D:
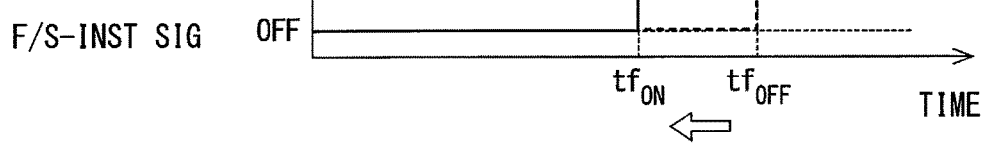
FIG. 6D is a time chart illustrating a fail-safe instruction signal in which the drive power in-excess state is continuing in the second embodiment of the present disclosure.

FIG. 6C differs from FIG. 3C, and there is no equivalent drawing corresponding to FIG. 3D. That is, FIG. 6D is equivalent to FIG. 3E.

According to the second embodiment, as the drive power in-excess indicator, an "absolute value of the drive power excess amount (E)" is monitored, instead of monitoring the excess drive power continuation time, which is described in the first embodiment.

According to the first embodiment, one threshold value α is set about the drive power excess amount E, and as long as the drive power excess amount E exceeds the threshold value α, the excess drive power continuation time is counted. Therefore, the excess drive power continuation time is counted in the same manner for two different cases, i.e., for a case shown by a solid line in FIG. 3C, in which the drive power excess amount E takes substantially a constant value after exceeding the threshold value α, and for another case shown by a two dot chain line in FIG. 3C, in which the drive power excess amount E continues to increase after exceeding the threshold value α. That means, when the vehicle-dynamic safety parameter conditions are the same, the in-excess determination that determines that the drive power is in excess is made at the same lapse time after exceeding the threshold value α, for the output of the fail-safe signal.

In the second embodiment, in addition to the threshold value α, a "indicator threshold value $β_{OFF}$ at the vehicle-dynamic safety parameter conditions OFF time" which is a value greater than the threshold value α is set for the drive power excess amount E. Then, as shown in FIG. 6C, the fail-safe instruction signal is output at time tf$_{OFF}$ at which the drive power excess amount E (i) increases to exceed the threshold value α, and (ii) increases further to exceed the indicator threshold value β$_{OFF}$. In case that the drive power excess amount E does not exceed the indicator threshold value β$_{OFF}$ after a lapse of a predetermined monitor time from time t0, the in-excess determination control may be ended in the same manner as the monitoring scheme shown in FIG. 4A/B/C/D/E in the first embodiment.

If the vehicle-dynamic safety parameter conditions are turned to ON at time t1 after starting the in-excess determination control, the indicator threshold value β$_{OFF}$ will be lowered to a smaller value β$_{ON}$. In such manner, the drive power excess amount E is determined as exceeding the threshold that has a smaller value, namely, a lighter security condition of the indicator threshold value β$_{ON}$ is used for the in-excess determination of the drive power. Further, as shown in FIG. 6C, when the drive power excess amount E continues to increase, the drive power excess amount E exceeds the smaller indicator threshold value β$_{ON}$ at an earlier timing, for the determination that the drive power is in excess.

As a result, the output timing of the fail-safe instruction signal is brought forward at time tf$_{ON}$ from time tf$_{OFF}$ (refer to FIG. 6D). Therefore, the second embodiment achieves the same effect as the first embodiment. Further, the in-excess determination control in the second embodiment is more advantageous in comparison to the one in the first embodiment in that the control not only compares the drive power excess amount E with the threshold value α, but also considers an absolute value of the drive power excess amount E in the in-excess determination control.

(Third Embodiment)

Figure 7A:
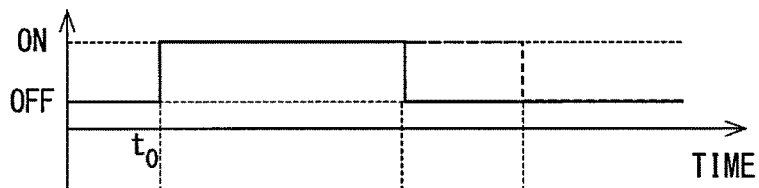
FIG. 7A is a time chart of the in-excess determination control in which the drive power in-excess state is continuing in a third embodiment of the present disclosure.
Figure 7B:
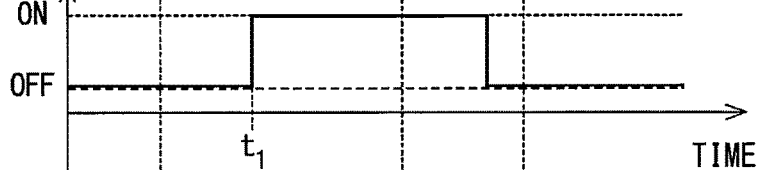
FIG. 7B is a time chart illustrating a fulfillment of the vehicle-dynamic safety parameter in which the drive power in-excess state is continuing in the third embodiment of the present disclosure.

The in-excess determination control in the third embodiment of the present disclosure is described with reference to the time charts in FIG. 7A/B/C/D/E. FIG. 7D differs from FIG. 3D. According to the third embodiment, as the drive power in-excess indicator, a "time integration value of the drive power excess amount E" is monitored, instead of monitoring the excess drive power continuation time, which is described in the first embodiment. In FIG. 7D, the "time integration value of the drive power excess amount E" is abbreviated to an "excess amount integrated value".

Figure 7C:
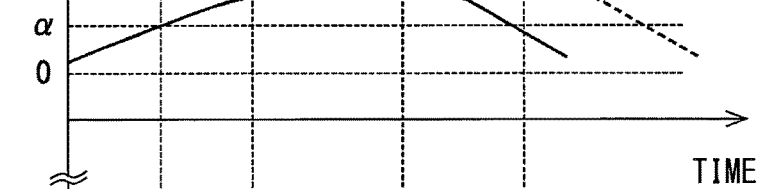
FIG. 7C is a time chart illustrating a drive power excess amount in which the drive power in-excess state is continuing in the third embodiment of the present disclosure.
Figure 7D:
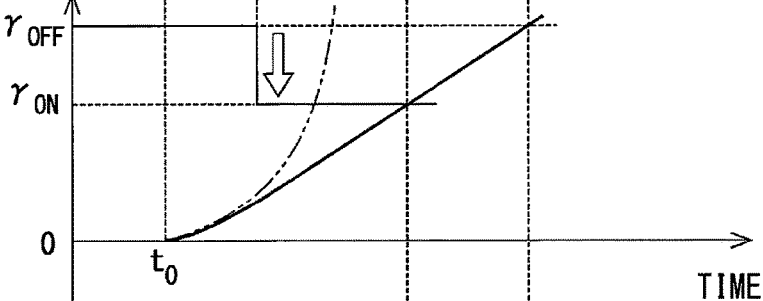
FIG. 7D is a time chart illustrating an excess drive power continuation time in which the drive power in-excess state is continuing in the third embodiment of the present disclosure.

The excess amount integrated value is, as shown in FIG. 7C, a number which is calculated as an integration of the drive power excess amount E along the time axis starting at time t0 at which the drive power excess amount E has exceeded the threshold value α, i.e., a time integration value calculated by using an equation "$\Sigma(E \cdot \Delta t)$".

For example, as shown by a solid line in FIG. 7C, an excess amount integrated value increases in a linear shape, when the drive power excess amount E after exceeding the threshold value α takes a constant value. Further, when the drive power excess amount E continues to increase after exceeding the threshold value α, as shown by a two-dot chain line in FIG. 7C, the excess amount integrated value increases in a parabolic shape.

Then, if the vehicle-dynamic safety parameter conditions are OFF as shown in FIG. 7B, the fail-safe instruction signal is output at time tf$_{OFF}$ when the excess amount integrated value has exceeded an "indicator threshold value γ$_{OFF}$ at the vehicle-dynamic safety parameter conditions OFF time".

Figure 7E:
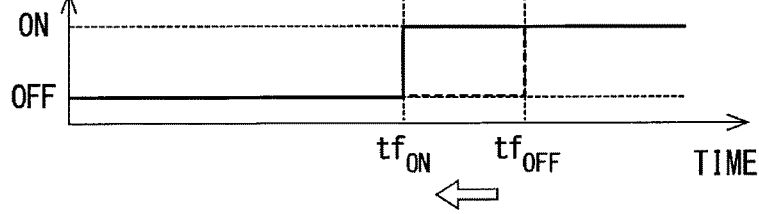
FIG. 7E is a time chart illustrating a fail-safe instruction signal in which the drive power in-excess state is continuing in the third embodiment of the present disclosure.

If vehicle-dynamic safety parameter conditions are turned to ON at time t1 after starting the in-excess determination control, the indicator threshold value γ$_{OFF}$ will be lowered to a smaller value γ$_{ON}$. As a result, the excess amount integrated value will exceed the indicator threshold value γ$_{ON}$ early, and the output timing of the fail-safe instruction signal is brought forward at time tf$_{ON}$ from time tf$_{OFF}$ (refer to FIG. 7E). Therefore, the third embodiment achieves the same effect as the above-mentioned embodiments. Moreover, in the third embodiment, time to determine that the drive power is in excess is set/determined according to the time integration value of the drive power excess amount E after exceeding the threshold value α. Therefore, the in-excess determination reflects the behavior of the vehicle after the excess of the drive power excess amount E exceeding the threshold value α.

In the second and third embodiments described above, the threshold lowered amount Δ may be changed according to the value of the vehicle-dynamic safety parameter, as described with reference to FIGS. 5A/B/C.

Further, the in-excess determination control may be performed based on a combination of the drive power in-excess determination quantities respectively described in the first to third embodiments.

(Other Embodiments)

Figure 8:
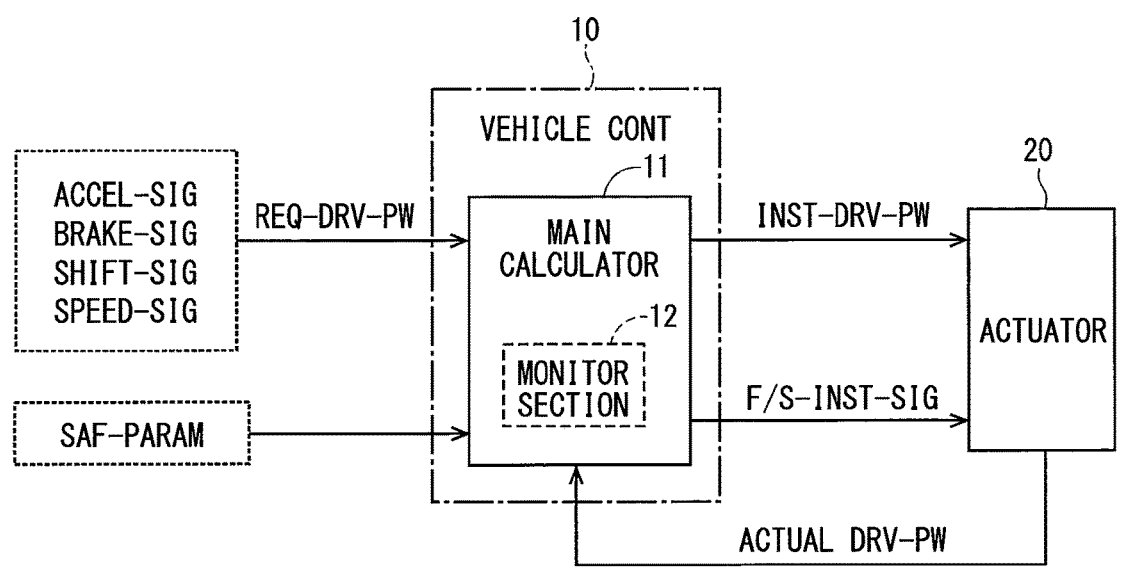
FIG. 8 is a block diagram of a vehicle control apparatus in other embodiments of the present disclosure.

In FIG. 1, the main calculator 11 in the vehicle controller 10 and the monitor section 12 are illustrated as separate objects. However, as shown in FIG. 8, a function of the monitor section 12 may be included in the main calculator 11. Further, in FIG. 8, without monitoring a solid line that represents the actual drive power transmitted from the actuator 20, only the instructed drive power which is communicated in an inside of the main calculator 11 may be monitored, as described in the above explanation of FIG. 1.

In FIG. 1, the fail-safe instruction signal is illustrated as a direct input from the vehicle controller 10 to the actuator 20. However, other control device(s) may be used to relay such an input. For example, in a hybrid vehicle, a hybrid ECU, which may correspond to the vehicle control apparatus 10, may control the drive of the engine and/or the motor-generator via various drive power source ECUS such as an engine ECU, a motor-generator ECU that respectively control the engine, the motor-generator and the like.

The vehicle-dynamic safety parameter in the present disclosure may reflect any vehicle behavior as long as the vehicle behavior is related to the travel safety of the vehicle. The technical field about the travel safety is a developing field and is expected to further develop. Therefore, even though not explicitly described in the specification of the present disclosure, it is reserved as not excluded from the present disclosure that a technology developed after the filing of the present disclosure in terms of the vehicle-dynamic safety parameters used therein.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A vehicle control apparatus comprising:
   an actuator configured to control a drive of a vehicle;
   a main calculator programmed to calculate an instructed drive power based on a requested drive power of the vehicle and programmed to instruct the actuator to operate according to the instructed drive power; and a monitor section programmed to monitor at least one of (i) the instructed drive power and (ii) an actual drive power that is output from the actuator according to the instructed drive power, wherein based on a drive power difference amount calculated by deducting the requested drive power from either the actual drive power or the instructed drive power, the vehicle control apparatus is programmed to perform a difference determination control that executes a fail-safe action regarding a drive of the vehicle by (i) monitoring a drive power difference indicator started at a time when the drive power difference amount differs from a predetermined value, and (ii) determining that the drive power difference amount is too large when the drive power difference indicator differs from a preset value of an indicator threshold for longer than a predetermined period of time, wherein the drive power difference indicator is an absolute value of the drive power difference amount, the vehicle control apparatus is programmed to, when performing the difference determination control, lower the indicator threshold when a vehicle-dynamic safety parameter that reflects a travel safety related vehicle behavior fulfills a prescribed condition, the vehicle control apparatus is programmed to determine whether the vehicle-dynamic safety parameter fulfills the prescribed condition after the determination that the drive power difference amount is too large, and the vehicle control apparatus is programmed to lower the indicator threshold after the determination that the drive power difference amount is too large.

2. The vehicle control apparatus of claim 1, wherein the vehicle-dynamic safety parameter is at least one of an amount of depression of a brake pedal, an amount of depression of an accelerator pedal, a steer angle of a steering wheel, a steering speed of the steering wheel, a steering angle of a front tire or a rear tire, a vehicle speed, an acceleration of the vehicle, a yaw angular velocity, a yaw angular acceleration, a difference between wheel speeds, a road surface friction coefficient, or a shift position.

3. The vehicle control apparatus of claim 1, wherein a lowering amount of the indicator threshold of the drive power difference indicator is changed according to a value of the vehicle-dynamic safety parameter.

4. The vehicle control apparatus of claim 3, wherein the vehicle-dynamic safety parameter represents a high degree of dangerous vehicle behavior when the value of the vehicle-dynamic safety parameter is large, the indicator threshold is lowered when the value of the vehicle-dynamic safety parameter is equal to or greater than a specified value, and
the lowering amount of the indicator threshold is increased in proportion to an increase of the value of the vehicle-dynamic safety parameter.

5. A vehicle control apparatus comprising:
an actuator configured to control a drive of a vehicle;
a main calculator programmed to calculate an instructed drive power based on a requested drive power of the vehicle and programmed to instruct the actuator to operate according to the instructed drive power; and
a monitor section programmed to monitor at least one of (i) the instructed drive power and (ii) an actual drive power that is output from the actuator according to the instructed drive power, wherein based on a drive power difference amount calculated by deducting the requested drive power from either the actual drive power or the instructed drive power, the vehicle control apparatus is programmed to perform a difference determination control that executes a fail-safe action regarding a drive of the vehicle when (i) a drive power difference indicator started at a time when the drive power difference amount differs from a predetermined value, and (ii) by determining that the drive power difference amount is too large when the drive power difference indicator differs from a preset value of an indicator threshold, wherein the drive power difference indicator is a time integration value of the drive power difference amount, the vehicle control apparatus is programmed to, when performing the difference determination control, lower the indicator threshold when a vehicle-dynamic safety parameter that reflects a travel safety related vehicle behavior fulfills a prescribed condition, the vehicle control apparatus is programmed to determine whether the vehicle-dynamic safety parameter fulfills the prescribed condition after the determination that the drive power difference is too large, and the vehicle control apparatus is programmed to lower the indicator threshold after the determination that the drive power difference amount is too large.

6. The vehicle control apparatus of claim 5, wherein the vehicle-dynamic safety parameter is at least one of an amount of depression of a brake pedal, an amount of depression of an accelerator pedal, a steer angle of a steering wheel, a steering speed of the steering wheel, a steering angle of a front tire or a rear tire, a vehicle speed, an acceleration of the vehicle, a yaw angular velocity, a yaw angular acceleration, a difference between wheel speeds, a road surface friction coefficient, or a shift position.

7. The vehicle control apparatus of claim 5, wherein a lowering amount of the indicator threshold of the drive power difference indicator is changed according to a value of the vehicle-dynamic safety parameter.

8. The vehicle control apparatus of claim 7, wherein the vehicle-dynamic safety parameter represents a high degree of dangerous vehicle behavior when the value of the vehicle-dynamic safety parameter is large, the indicator threshold is lowered when the value of the vehicle-dynamic safety parameter is equal to or greater than a specified value, and
the lowering amount of the indicator threshold is increased in proportion to an increase of the value of the vehicle-dynamic safety parameter.

* * * * *